United States Patent
Gackiere (10) Patent No.: US 10,223,389 B2
(45) Date of Patent: Mar. 5, 2019

(54) SYSTEM AND METHOD FOR ANALYZING COMPLEX METADATA

(71) Applicant: salesforce.com, inc., San Francisco, CA (US)

(72) Inventor: Gregory Gackiere, Charlotte, NC (US)

(73) Assignee: salesforce.com, inc., San Francisco, CA (US)

( * ) Notice: Subject to any disclaimer, the term of this patent is extended or adjusted under 35 U.S.C. 154(b) by 586 days.

(21) Appl. No.: 14/930,832

(22) Filed: Nov. 3, 2015

(65) Prior Publication Data

US 2017/0124124 A1  May 4, 2017

(51) Int. Cl.
*G06F 17/30* (2006.01)

(52) U.S. Cl.
CPC .. *G06F 17/30303* (2013.01); *G06F 17/30339* (2013.01)

(58) Field of Classification Search
CPC .............. G06F 17/30303; G06F 17/30339
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |

(Continued)

*Primary Examiner* — Jorge A Casanova
(74) *Attorney, Agent, or Firm* — Lorenz & Kopf, LLP (57) ABSTRACT

In one embodiment, a computer-implemented method executable by a computer to analyze complex metadata of a data source is provided. The method includes: receiving, by a processor, complex metadata from the data source; processing, by a processor, the complex metadata to determine a dictionary of metadata; processing, by a processor, the dictionary of metadata to determine a graph of nodes and edges; processing, by a processor, the graph using a single feature analysis method; and displaying a representation of a visual graph based on results of the feature analysis method.

14 Claims, 13 Drawing Sheets

(56) References Cited

U.S. PATENT DOCUMENTS

| | | |
|---|---|---|
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,886,655 B1 * | 11/2014 | Nandy ............. G06F 17/30994 707/749 |
| 9,798,829 B1 * | 10/2017 | Baisley ............. G06F 17/30958 |
| 9,898,553 B2 * | 2/2018 | Gralnick ............. G06F 17/30958 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0078204 A1 * | 3/2011 | Lotikar ............. G06F 17/30392 707/794 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0040294 A1 * | 2/2014 | An ............. G06F 17/30386 707/756 |
| 2015/0339835 A1 * | 11/2015 | Mohr ............. G06T 11/206 345/440 |
| 2016/0188767 A1 * | 6/2016 | Razin ............. G06F 17/509 703/13 |

* cited by examiner

SYSTEM AND METHOD FOR ANALYZING COMPLEX METADATA

TECHNICAL FIELD

Embodiments of the subject matter described herein relate generally to methods and systems for analyzing metadata. More particularly, embodiments of the subject matter relate to methods and systems for analyzing complex metadata.

BACKGROUND

Certain database systems host a plethora of metadata relating to individuals, entities, and/or multiple entities associated with multiple individuals. The metadata may be interrelated. The metadata may be continuously evolving. Such metadata having a large volume, having varying relationships, and/or that are continuously evolving is considered as complex metadata.

In many cases it is desirable to analyze the complex metadata. Conventional data analysis tools of such complex metadata generate tabular oriented options where the data is represented through tables and lists. For example, the data may be presented in a spreadsheet type format having multiple columns, and multiple sheets. Review of such lengthy spreadsheets can be difficult, time-consuming, and costly. In addition, relationships between data objects may be difficult to discern, if at all.

Accordingly, it is desirable to provide improved data analysis methods and systems. Furthermore, other desirable features and characteristics will become apparent from the subsequent detailed description and the appended claims, taken in conjunction with the accompanying drawings and the foregoing technical field and background.

SUMMARY

In one embodiment, a computer-implemented method executable by a computer to analyze complex metadata of a data source is provided. The method includes: receiving, by a processor, complex metadata from the data source; processing, by a processor, the complex metadata to determine a dictionary of metadata; processing, by a processor, the dictionary of metadata to determine a graph of nodes and edges; processing, by a processor, the graph using a single feature analysis method; and displaying a representation of a visual graph based on results of the feature analysis method.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely exemplary in nature and is not intended to limit the disclosure the application and uses of the disclosure. Furthermore, there is no intention to be bound by any expressed or implied theory presented in the preceding technical field, background, brief summary or the following detailed description. It should be understood that throughout the drawings, corresponding reference numerals indicate like or corresponding parts and features.

The exemplary embodiments presented herein relate to a metadata analyzing system and related techniques, methodologies, procedures, and technology for analyzing complex metadata. As can be appreciated, the described subject matter can be implemented in the context of various environments. For exemplary purposes, the subject matter is described in the context of a computer-implemented environment relating to, for example, software products for a software-based system, a database system, a multi-tenant environment, or the like. Moreover, the described subject matter can be implemented in connection with two or more separate and distinct computer-implemented systems that cooperate and communicate with one another.

In accordance with exemplary embodiments described below, a computer based system is provided, such as a multi-tenant system that is used to provide a service to a plurality of different tenants, a plurality of different end users, and/or a plurality of different tenant applications. The multi-tenant system stores a plethora of metadata that is used for generating one or more virtual applications for servicing the plurality of different tenants, the plurality of different end users, and/or the plurality of different tenant applications. The metadata may be defined by the multi-tenant system and/or may be created by a user using the multi-tenant system. Depending on the number of tenants in the system and the number of applications of the multi-tenant system, the volume of stored metadata for one tenant or for all tenants can be large and the metadata and relationships of the metadata can complex. The data analyzing system provides a way to analyze a large volume of complex metadata and generate user friendly graphs to assess features of the data such as, but not limited to, risks, relationships, usage, etc.

Figure 1:
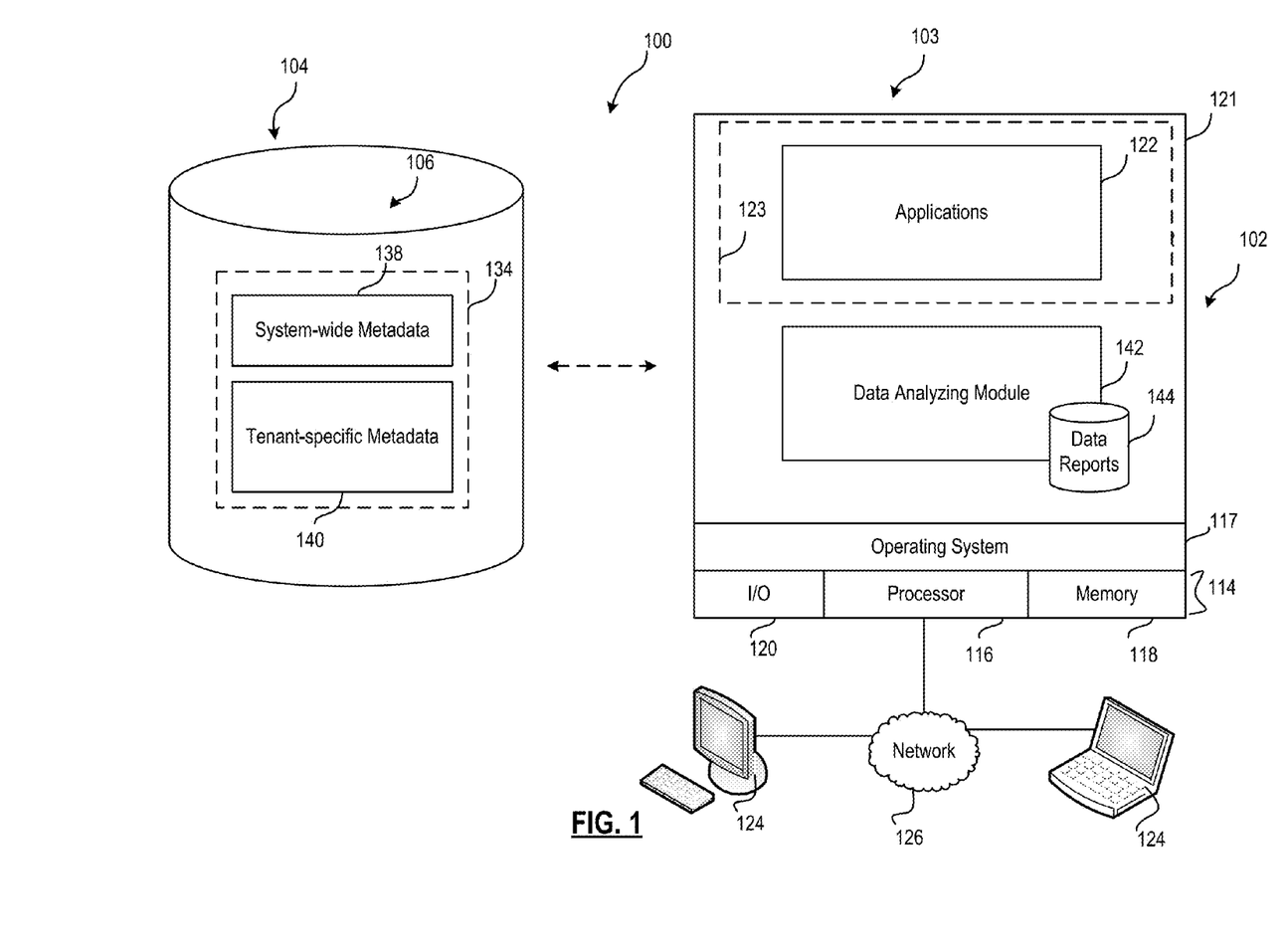
FIG. 1 is a block diagram of an exemplary data analyzing system having a data analyzer module in accordance with various embodiments.

Turning now to FIG. 1, an exemplary computing system 100 having a data analyzing system 102 is shown in accordance with various embodiments. The computing system 100 generally includes at least one server 103 that is associated with at least one data source 104. In accordance with various non-limiting examples, the system 100 may be implemented in the form of a multi-tenant customer relationship management system that can support any number of authenticated users of multiple tenants. A "tenant" or an "organization" generally refers to a group of users that shares access to data 106 within the data source 104. Tenants may represent customers, customer departments, business or legal organizations, and/or any other entities that maintain data for particular sets of users within the system 100. Although multiple tenants may share access to the server 103 and the data source 104, the particular data and services provided from the server 103 to each tenant can be securely isolated from those provided to other tenants. The multi-tenant architecture therefore allows different sets of users to share functionality while managing the sharing of any or none of the data 106. The users and/or tenants share access through one or more user devices 124 such as virtual machines or other computing devices that communicate with the server 103 via a network 126.

The server 103 generally includes any sort of conventional processing hardware 114, such as a processor 116, memory 118, input/output features 120 and the like, that are managed and accessed by a suitable operating system 117. The processor 116 may be implemented using one or more of microprocessors, microcontrollers, processing cores and/or other computing resources spread across any number of distributed or integrated systems, including any number of "cloud-based" or other virtual systems. The memory 118 represents any non-transitory short or long term storage capable of storing programming instructions for execution on the processor 116, including any sort of random access memory (RAM), read only memory (ROM), flash memory, magnetic or optical mass storage, and/or the like. The input/output features 120 represent conventional interfaces to networks (e.g., to the network 126, or any other local area, wide area or other network), mass storage, display devices, data entry devices and/or the like. As can be appreciated, the server 103 may be implemented using a cluster of actual and/or virtual servers operating in conjunction with each other, typically in association with conventional network communications, cluster management, load balancing and other features as appropriate.

The server 103 typically includes or cooperates with some type of computer-readable media 121, where a tangible computer-readable medium has computer-executable instructions stored thereon. The computer-executable instructions, when read and executed by the server 103, cause the server 103 to perform certain tasks, operations, functions, and processes described in more detail herein. In this regard, the memory 118 may represent one suitable implementation of such computer-readable media. Alternatively or additionally, the server 103 could receive and cooperate with computer-readable media (not separately shown) that is realized as a portable or mobile component or platform, e.g., a portable hard drive, a USB flash drive, an optical disc, or the like.

The server 103, as shown, further includes an application platform 123 and that may be any sort of software application or other data processing engine that generates virtual applications 122 that provide data and/or services to user devices 124. The virtual applications 122 are typically generated at run-time in response to queries received from the user devices 124. The user devices 124 are typically operated by various tenants that subscribe to the system 100 and that access the system 100 via the network 126. The virtual applications 122 are typically built by a user based on metadata constructs. For example, the virtual applications 122 created by or for the tenants may be constructed in accordance with metadata 134, which describes particular tables, reports, interfaces and/or other features of the particular application and which may be stored in the data source 104.

The data source 104 is any sort of repository or other data storage system capable of storing and managing the data 106 associated with any number of tenants. The data source 104 may be implemented using any type of conventional database server hardware. In various embodiments, the data source 104 shares processing hardware 114 with the server 103. In other embodiments, the data source 104 is implemented using separate physical and/or virtual database server hardware that communicates with the server 103 to perform the various functions described herein.

In various embodiments, the data source 104 stores the metadata 134 used to create the virtual applications 122. The metadata 134 may be organized and formatted in any manner to support the application platform 123. In various embodiments, the metadata 134 is suitably organized into a relatively small number of large data tables to maintain a semi-amorphous "heap"-type format. The metadata 134 can then be organized as needed for a particular virtual application 122. In various embodiments, conventional data relationships are established using any number of pivot tables that establish indexing, uniqueness, relationships between entities, and/or other aspects of conventional database organization as desired.

In various embodiments, the metadata 134 can include system-wide metadata 138 and tenant-specific metadata 140. The system-wide metadata 138 can be used to describe any number of forms, reports, workflows, user access privileges, business logic and other constructs that are common to multiple tenants. The tenant-specific metadata 140 can include formatting, functions and other constructs built for each tenant, as desired.

Rather than forcing the data 106 into an inflexible global structure that is common to all tenants and applications, the data source 104 is organized to be relatively amorphous, with the metadata 134 providing additional structure on an as-needed basis. To that end, the application platform 123 suitably uses the metadata 134 to generate "virtual" components of the virtual applications 122 to logically obtain, process, and present the relatively amorphous data 106 from the data source 104.

In various embodiments, the computer-readable media 121 associated with the server 103 includes a data analyzing module 142 in accordance with the present disclosure. The data analyzing module 142 includes computer-executable instructions that, when executed by the processor 116 of the server 103, analyze the metadata 134 of the data source 104 and generate one or more user friendly data reports 144. In various embodiments, the data analyzing module 142 analyzes the metadata 134 for a particular tenant and/or for multiple tenants.

In various other embodiments, the data analyzing module 142 resides on user device 124 having a computer readable media (not shown) and a processor (not shown). In such embodiments, the data analyzing module 142 is included in the computer readable media of the user device 124 and includes computer-executable instructions that, when executed by the processor of the user device 124, analyze the metadata 134 of the data source 104 and generate one or more user friendly data reports 144. In various embodiments, the data analyzing module 142 analyzes the metadata 134 for a particular tenant and/or for multiple tenants. As can be appreciated, the data source 104 may be part of the server 103, may be a part of the user device 124, or partially part of the server 103 and partially part of the user device 124.

Figure 2:
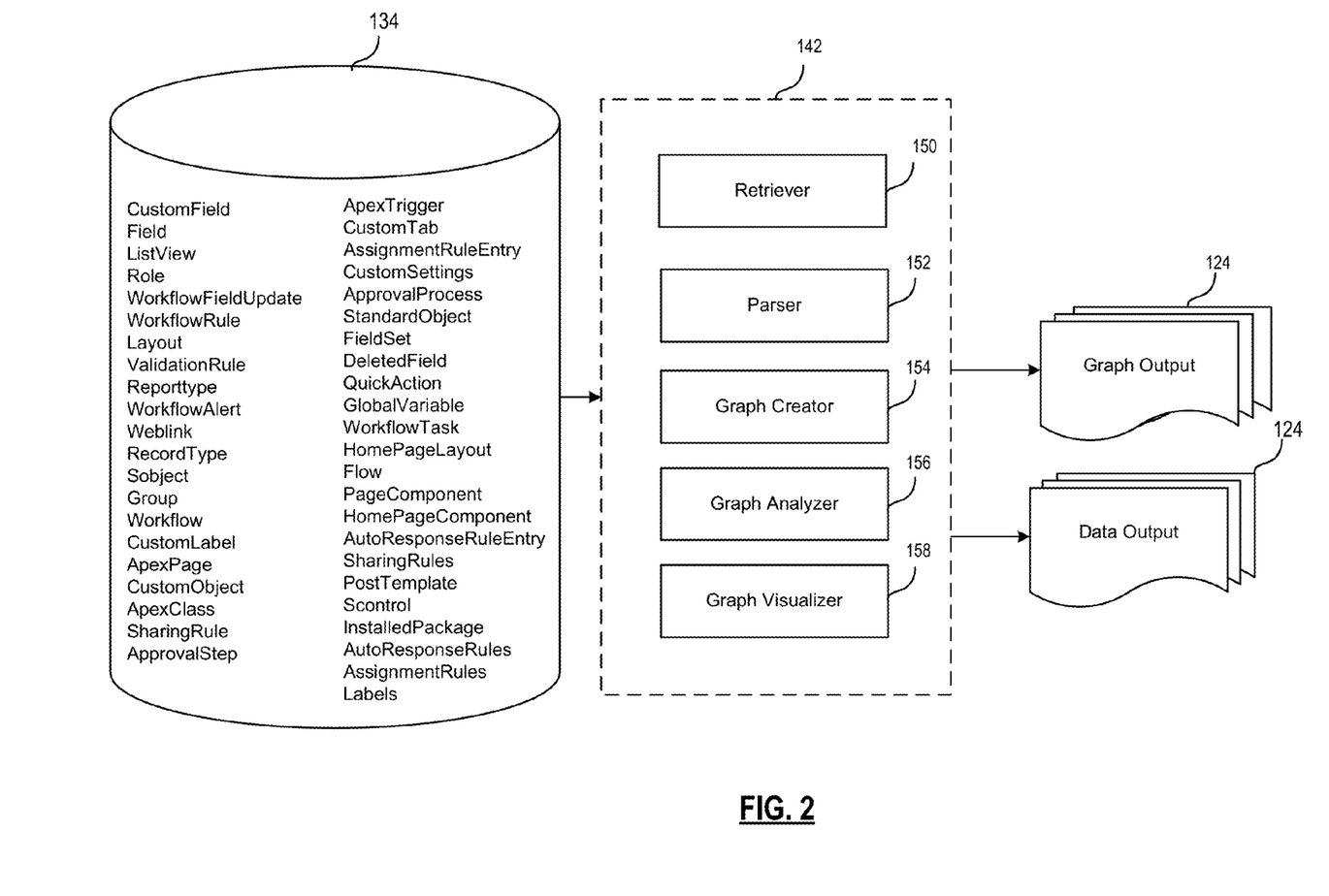
FIG. 2 is a dataflow diagram illustrating a data analyzing module in accordance with various embodiments.

Referring now to FIG. 2 and with continued reference to FIG. 1, a block diagram illustrates more detail of an exemplary data analyzing module 142 suitable for use in a computer-implemented server system such as the system 100 shown in FIG. 1. As can be appreciated, various exemplary embodiments of the data analyzing module 142, according to the present disclosure, may include any number of sub-modules. In various exemplary embodiments, the sub-modules shown in FIG. 2 may be combined and/or further partitioned to analyze the metadata 134. In various exemplary embodiments, the data analyzing module 142 includes a retriever 150, a parser 152, a graph creator 154, a graph analyzer 156, and a graph visualizer 158.

The retriever 150 retrieves the metadata 134 from the data source 104. The retriever 150 creates a dictionary that includes definitions for all metadata objects of the metadata 134. In various embodiments, the metadata objects can include, but are not limited to custom fields, any number of fields, list views, roles, workflow field updates, workflow rules, layouts, validation rules, report types, workflow alerts, web links, record types, s objects, groups, workflows, custom labels, apex pages, custom objects, apex classes, sharing rules, approval steps, apex triggers, custom tabs, assignment rule entries, custom settings, approval processes, standard objects, field sets, deleted fields, quick actions, global variables, workflow tasks, home page layouts, flows, page components, home page components, auto response rule entries, sharing rules, post templates, s controls, installed packages, auto response rules, assignment rules, labels, and any other type of data. One or more of the defined metadata objects may be related to other defined metadata objects. The retriever 150 includes the definition and the relationships in the dictionary. The dictionary can be defined in an XML or other format.

The parser 152 evaluates each element of the dictionary and the relationships defined in the dictionary to determine nodes and edges. In various embodiments, the nodes represent a metadata object, logical elements of a metadata object, and/or logical sub-element of a metadata object; and the edges represent the relationships between the metadata objects. In various embodiments, the edges can be defined to include a direction which indicates a direction of the relationships between the metadata objects. In various embodiments, each node pair can be defined to include more than one relationship. In various embodiments, each node can be defined by information such as, but not limited to, an identifier, a name, a prefix, a metadata type, active status, and related objects. The nodes and edges can be defined in a Java or other format.

The graph creator 154 creates a graph based on the nodes and the edges. In various embodiments, the graph can be a directed graph where the edges are defined to include a direction. Alternatively, the graph can be an undirected graph where the definitions of the edges do not include a direction.

The graph analyzer 156 analyzes the graph and generates one or more data outputs. The graph analyzer 156 analyzes the graph based on one or more analysis methods. In various embodiments, the analysis methods can include, but are not limited to, an impact analysis, a use analysis, a contagion analysis, a cleaning analysis, a toxicity analysis, a collision analysis, and other analysis.

The graph visualizer 158 receives the results of the analysis and generates data outputs. The data outputs can be visual and/or textual outputs that illustrate the data results in a user friendly manner. In various embodiments, the data outputs can relate to the impact of metadata, the use of metadata, the contagion of metadata, the cleaning of metadata, the toxicity of metadata, the collision detection of metadata, and other information. In various embodiments, the data outputs can be graphs generated using a visualization program such as, but not limited to, Gephi, Cytoscape, Sigma, or other visualization program.

As can be appreciated, the results of the analysis can be provided in a variety of formats. FIGS. 4-9 illustrate exemplary visual formats for presenting results. These exemplary visual formats are some examples of the many formats that can be used to present the data outputs according to the various metadata analysis techniques.

Figure 4:
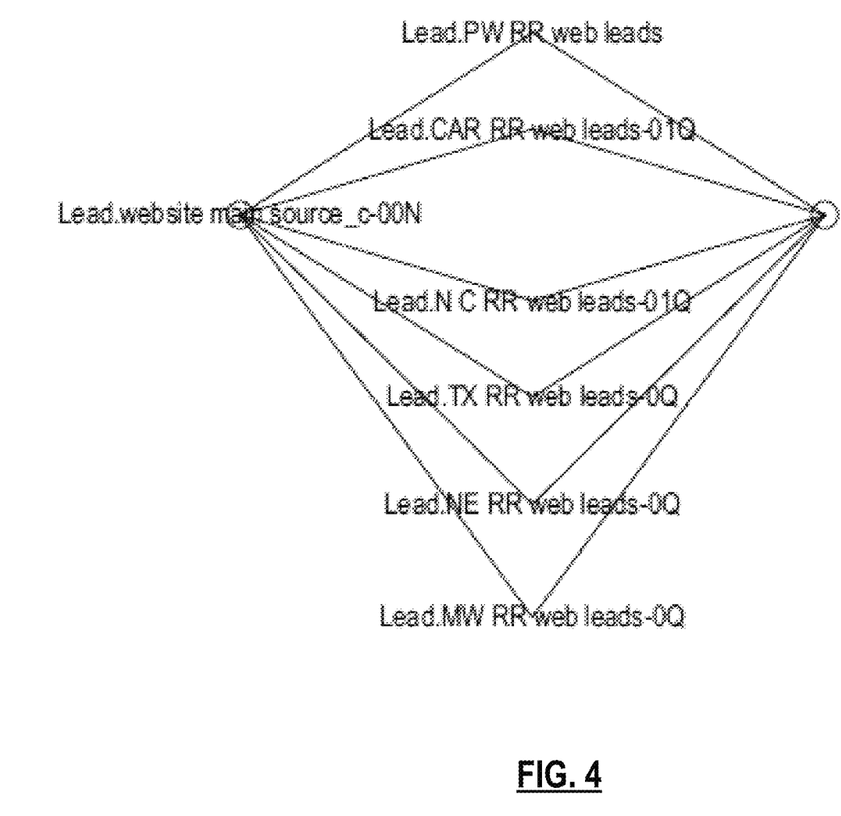
FIGS. 4-13 are graphs illustrating data outputs of the data analyzing module in accordance with various embodiments.

FIG. 4, for example, illustrates exemplary results of an impact analysis. The impact analysis determines an impact of a metadata object. For example, the impact analysis filters the nodes of the graph based on their metadata type and filters the edges of the graph based on a relevancy. Upon completion of the filtering, the impact analysis builds a map of remaining nodes and edges.

Figure 5:
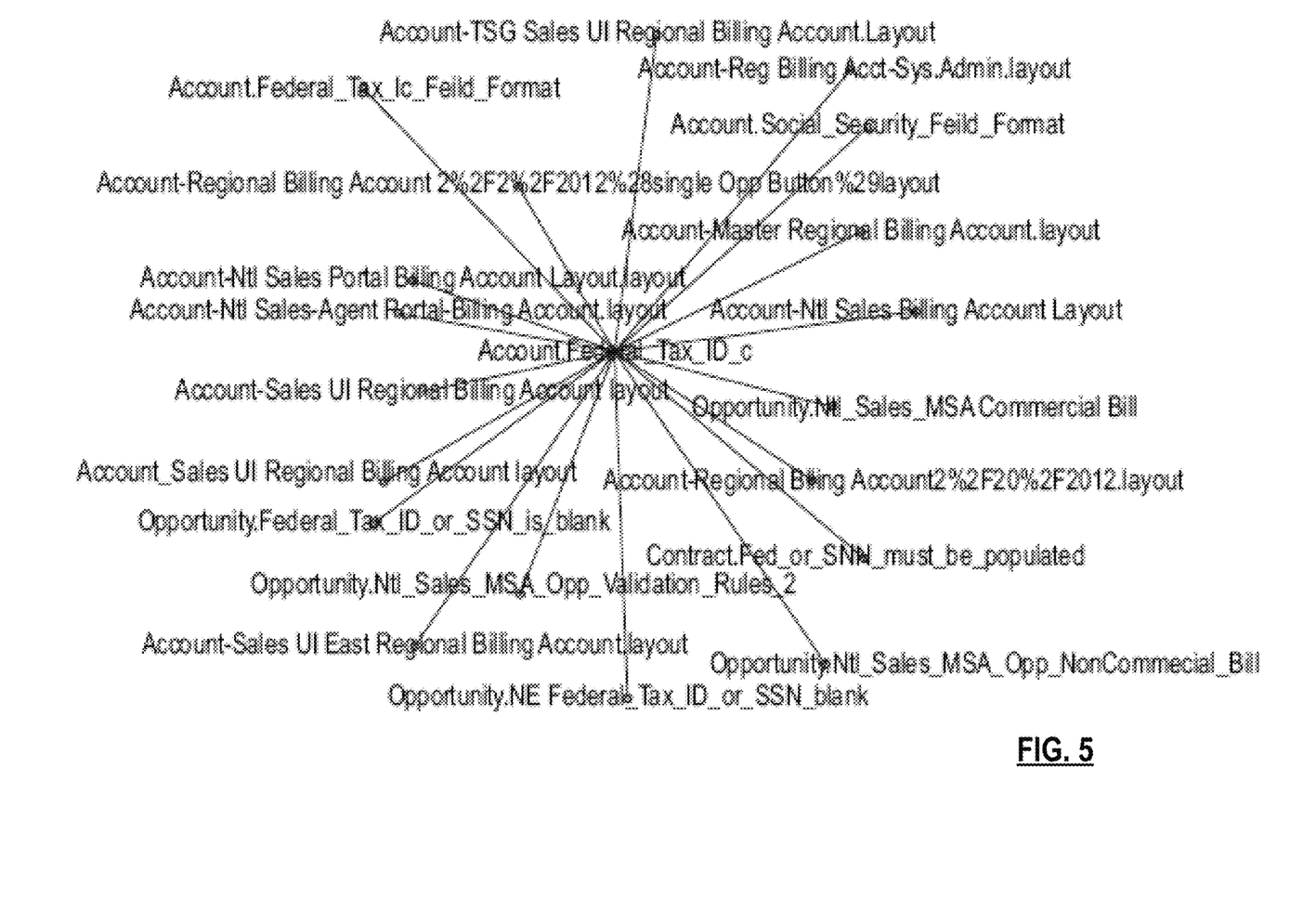

FIG. 5, for example, illustrates exemplary results of a use analysis. The use analysis analyzes the use of metadata based on parameters. The parameters may be user defined and/or predefined. The use analysis analyzes the metadata to build a map illustrating the usage of the metadata objects associated with the parameters. For example, the parameters can define a specific tenant or certain boundaries of metadata in the data source. In another example, the parameters can define a particular field or subset of fields. As can be appreciated, the parameters can define any feature related to the metadata objects and is not limited to the present examples.

Figure 6:
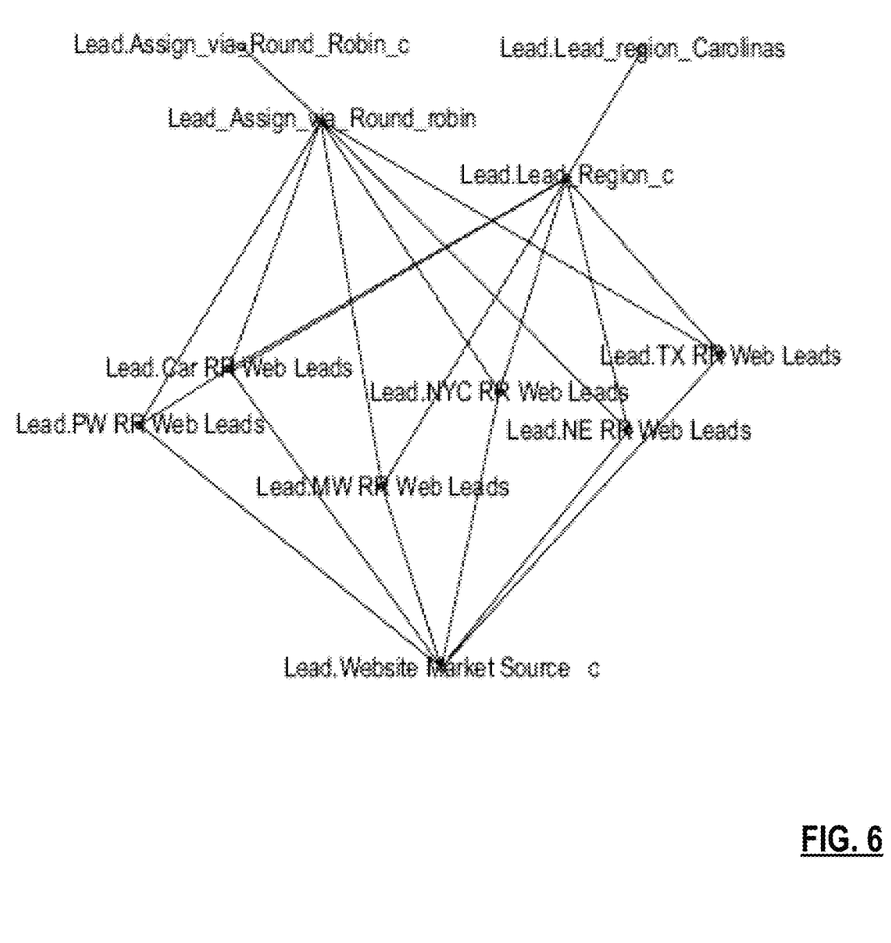

FIG. 6, for example, illustrates exemplary results of a contagion analysis. The contagion analysis evaluates the nodes and the edges to determine a chain of relationships. The contagion analysis then builds a map illustrating the chains of relationships. For example, the metadata objects having the greatest chains of relationships can be identified and illustrated. The chains illustrate the effects that one or more metadata objects may have. For example, if a particular metadata object representing a field is filled with bad data and the field is used in reports, as entry criteria for a particular workflow to update a third-party application, etc. the damaging effect can be measured.

Figure 7:
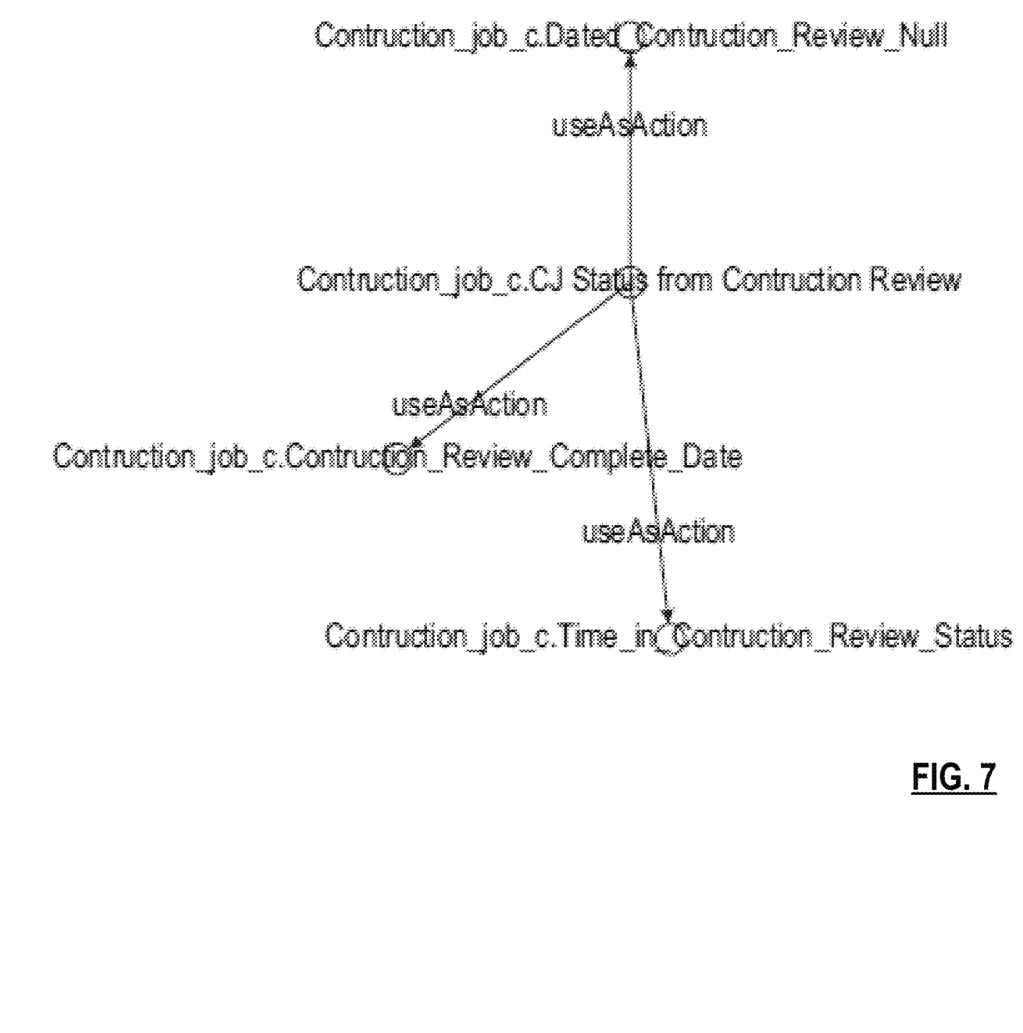

FIG. 7, for example, illustrates exemplary results of a cleaning analysis. The cleaning analysis evaluates the nodes and edges to determine unused metadata objects, metadata objects having little or no relationships, or metadata objects that may be duplicates. Based on the evaluation, the cleaning analysis identifies and illustrates metadata objects that can be removed.

Figure 8:
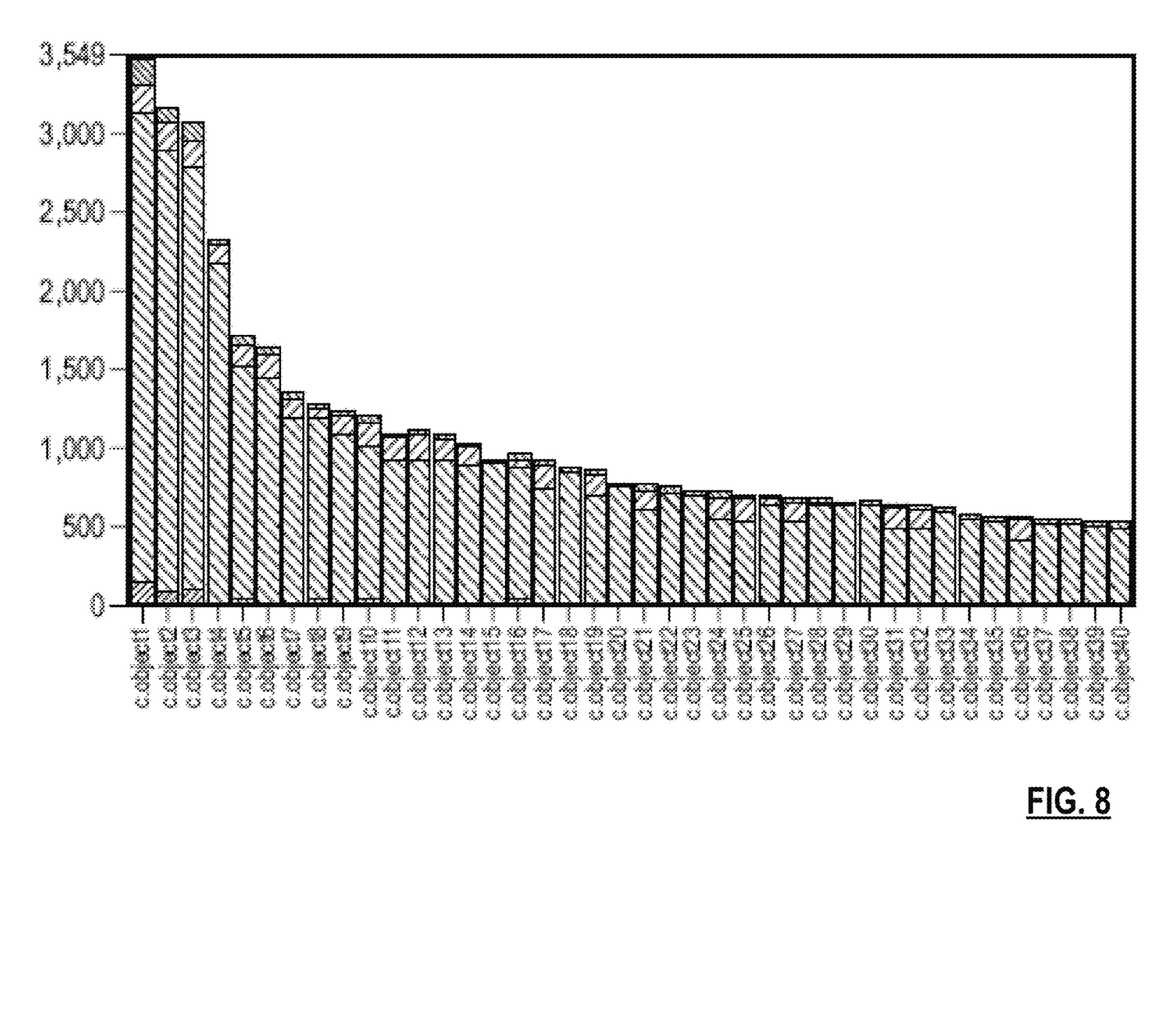

FIG. 8, for example, illustrates exemplary results of a toxicity analysis. The toxicity analysis evaluates the nodes and the edges to identify the most central/crucial metadata objects. This analysis can be specific to certain metadata types, for example, specific to the ability to list the top X custom fields used and referenced in other types of metadata objects such as in the page layouts, reports, workflows etc. The toxicity analysis can be used to be able to quickly see that a change to these elements can have side effects on a large number of other pieces and will require a more granular analysis, or simply to be able to say that a particular element subject to removal would require a more granular analysis to make sure that the removal will not have a side effect on an important piece of the application.

Figure 9:
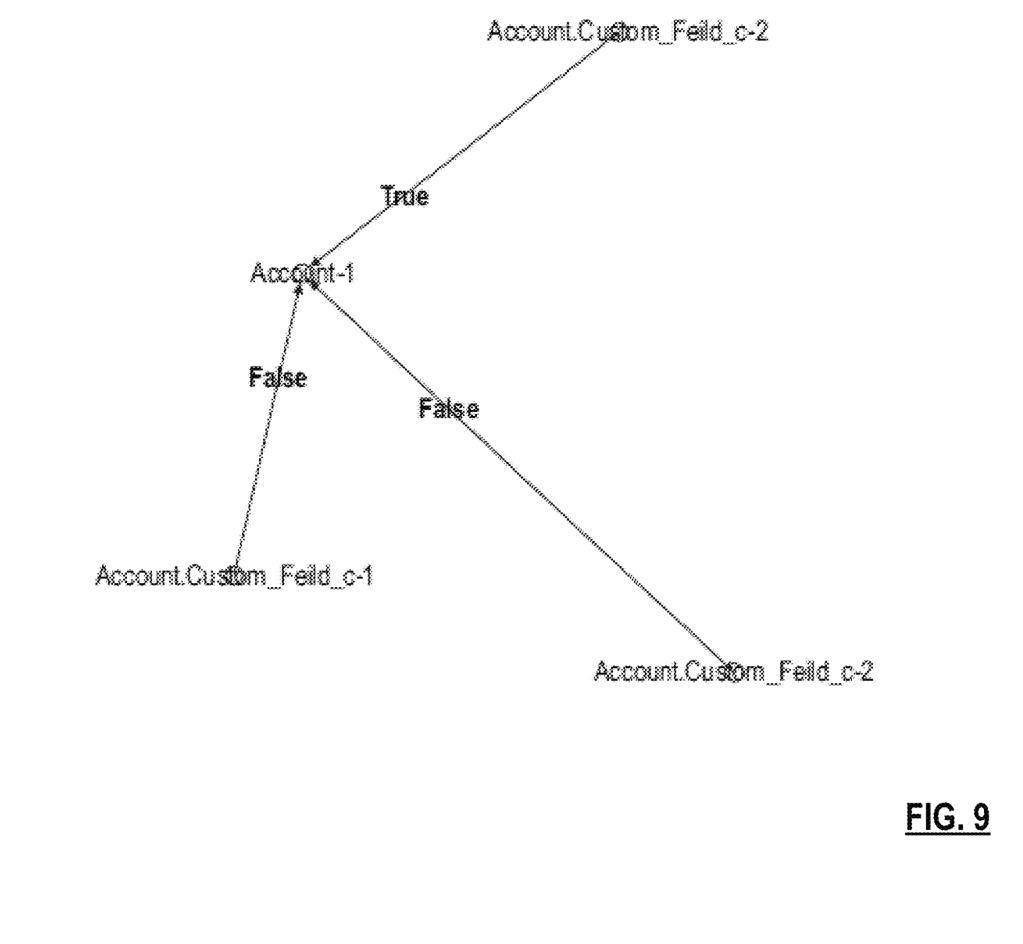
Figure 10:
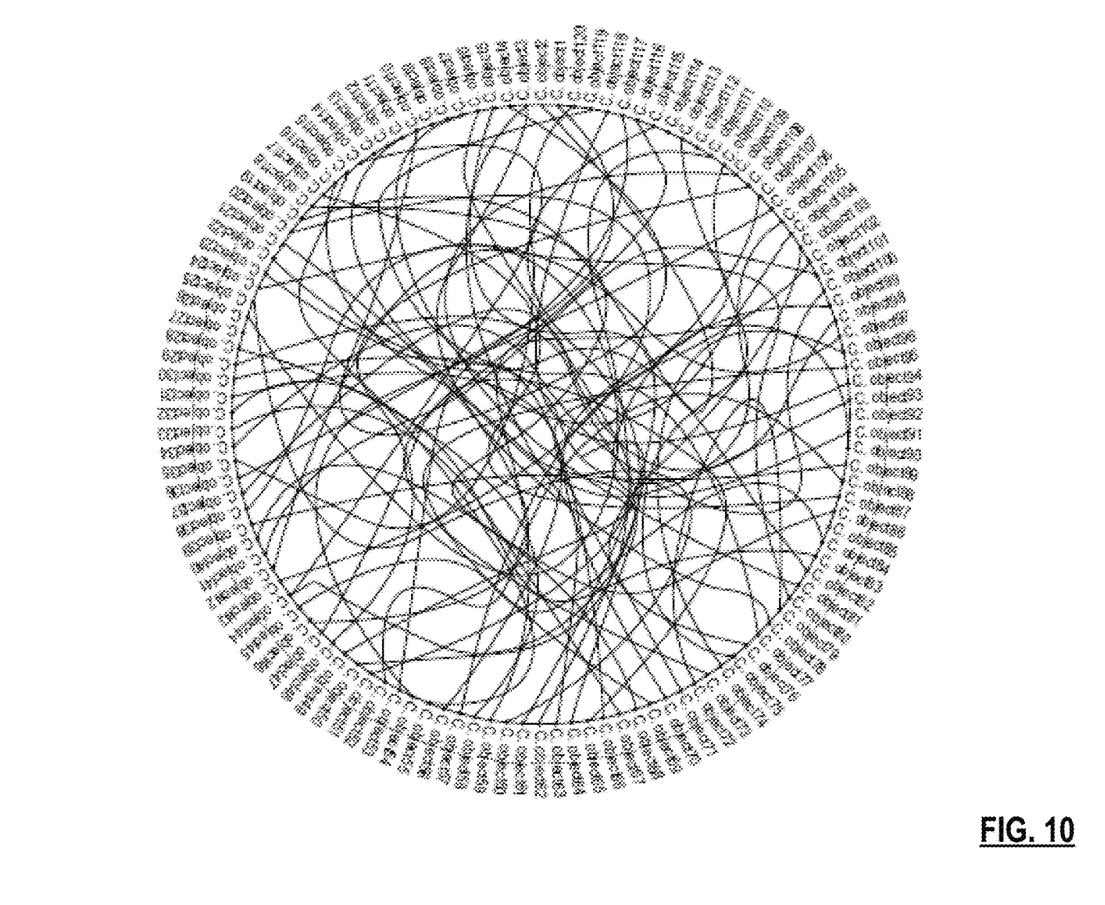
Figure 11:
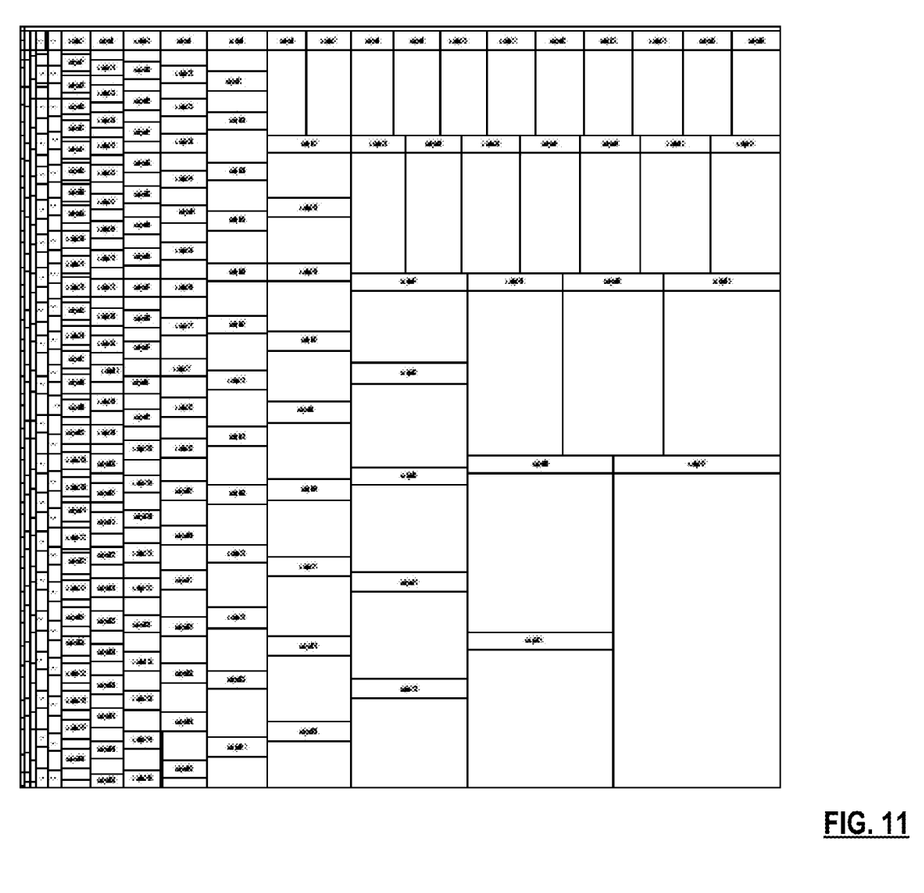
Figure 12:
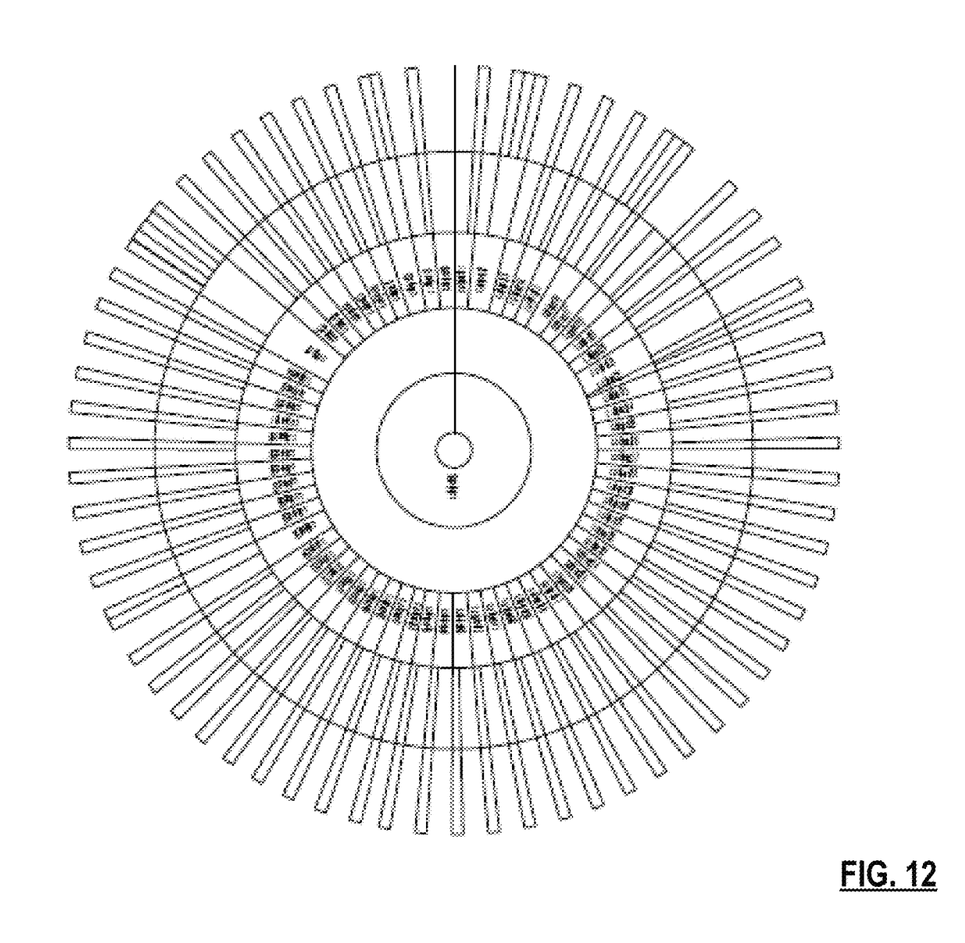
Figure 13:
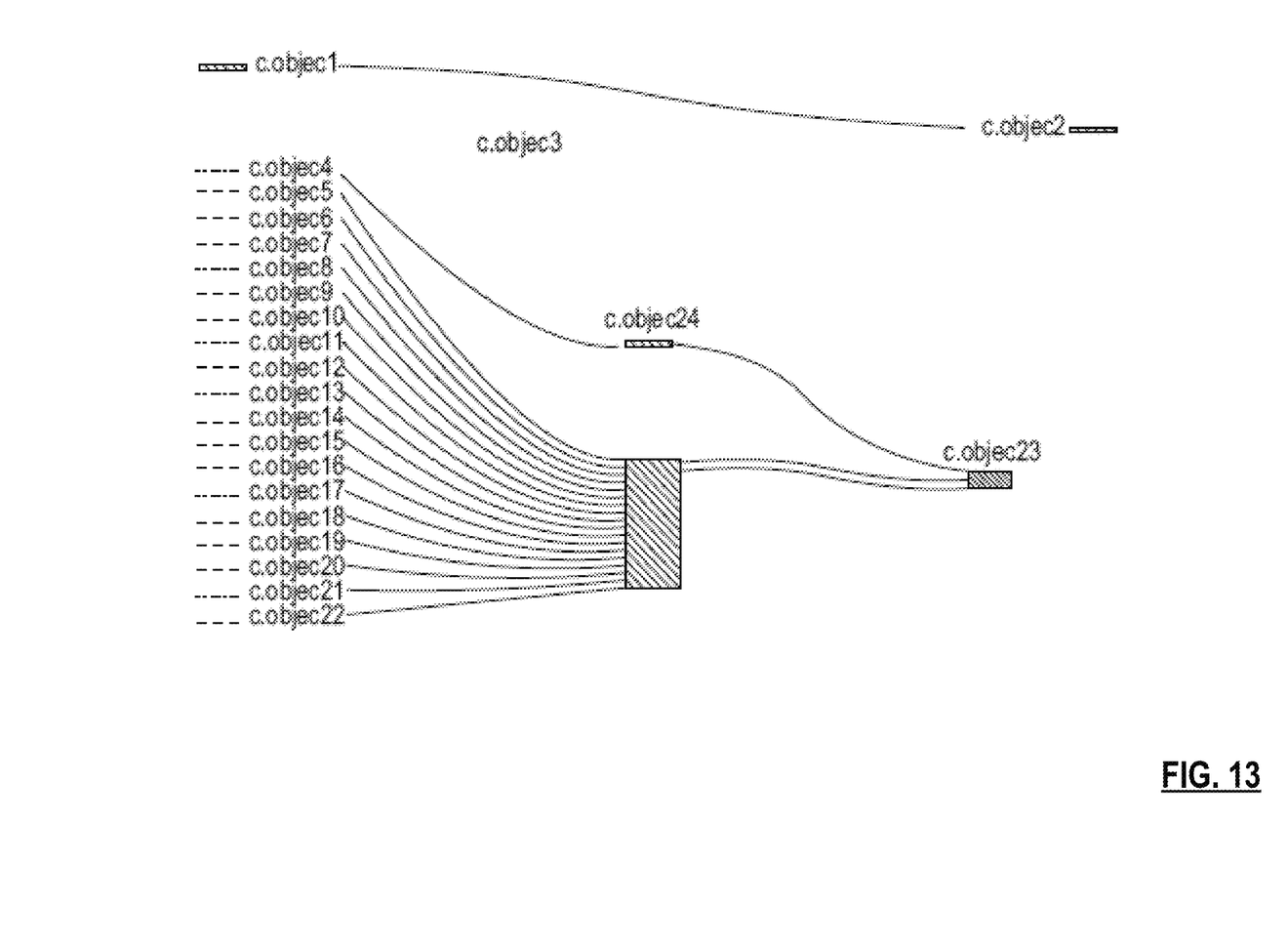

FIG. 9, for example, illustrates exemplary results of a collision analysis. The collision analysis can be used, for example, to study the impact of a deployment of a set of metadata objects in an existing data source or, when it is desired to study the impact of merging two data sources. In these use cases, the collision analysis provides an indication of objects which are considered as duplicates and those which can be considered as compatible with the destination. For example, the result of this analysis adds an extra "conflict" attribute on the edge between the object and the duplicate field. The analysis sets the conflict attribute to "true" or "false" based on the results.

As can be appreciated, other forms of analysis can be performed and other graphs and/or text outputs can be produced from the graph data. For example, FIG. 10 can be produced which provides a visualization of relationships defined in formula fields with other fields or formula fields. In another example, FIG. 11 can be produced which provides a visualization of levels of customization made on all of the standard and custom metadata objects (or a subset of these objects) such that one can quickly see where the complexities are and where to invest time in order to have an greater impact. In still another example, FIG. 12 can be produced which provides a visualization of workflow rules and workflow actions that are defined on a set of particular metadata objects. In still another example, FIG. 13 can be produced which provides a visualization of a set of fields and where the fields are referenced in other metadata objects. As can be appreciated FIGS. 10-13 are merely exemplary, as in various embodiments, other graph and/or text outputs can be produced.

Figure 3:
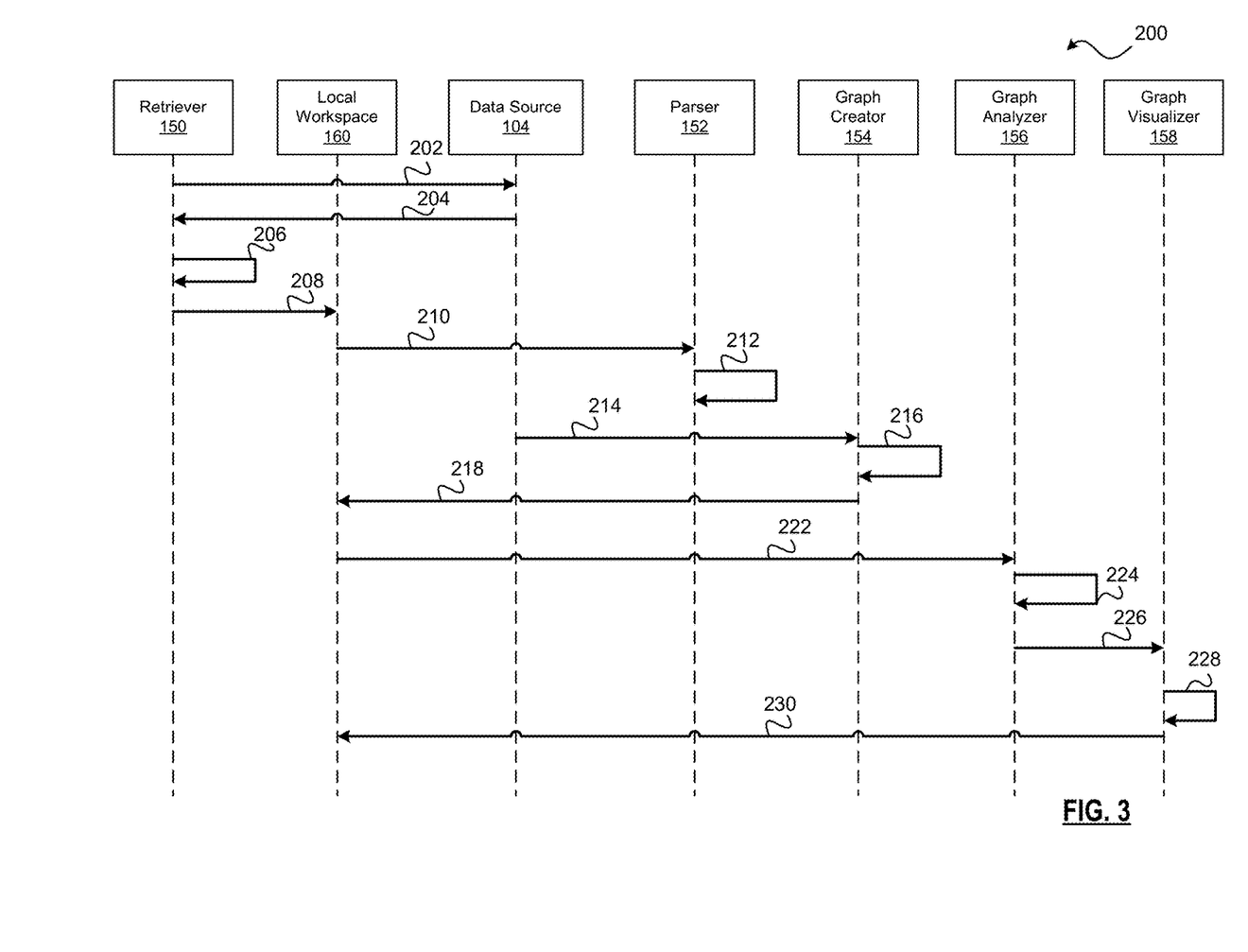
FIG. 3 is a sequence diagram illustrating a data analyzing method that may be performed by the data analyzing system in accordance with various embodiments.

Turning now to FIG. 3, a sequence diagram illustrates an exemplary method of analyzing data. The various tasks performed in connection with the method may be performed by software, hardware, firmware, or any combination thereof. In other words, the method may represent a computer-implemented method to analyze data. In particular, the method is executable by a suitably configured server system or a functional module of a server system, such as the system 100 described above. For illustrative purposes, the following description of the method may refer to elements mentioned above in connection with FIGS. 1-2. In practice, portions of the method may be performed by different elements of the described system. As can be appreciated, the method may include any number of additional or alternative steps, the steps shown in FIG. 3 need not be performed in the illustrated order, and the method may be incorporated into a more comprehensive procedure or process having additional functionality not described in detail herein. Moreover, one or more of the steps shown in FIG. 10 could be omitted from embodiments of the method as long as the intended overall functionality remains intact.

With reference to FIG. 3 and with continued reference to FIGS. 1-2, a method 200 of analyzing metadata 134 is provided. The method 200 may begin at 202 when the retriever 150 requests the metadata 134 from the data source 104 and, in return, the data source 104 provides metadata files at 204. The retriever 150 then processes the metadata files to determine the dictionary of metadata objects at 206. For example, the retriever 150 processes the metadata files based on a list of component types. For each component type in the list, the metadata objects having that type are gathered and the associated information is used to create the dictionary entry. The process repeats for each component type in the component list.

Once all of the component types have been processed, the completed dictionary is provided to the local workspace 160 (e.g., residing on the server 103 or workstation 124 running the analysis) at 208. The local workspace 160 generates a request to parse the dictionary at 210. The parser 152 then processes the dictionary files to determine the node and edges at 212. For example, the dictionary files may be provided in XML format, and a service layer may be defined that leverages a core library, along with some helper classes to process the XML data. In various embodiments, the service layer binds the XML information to Java types. For example, the service layer processes the metadata objects, type by type and extracts the implicit or explicit relationships defined in the metadata files. All the elements extracted are then compared to the information stored in the dictionary files in order to be able to highlight ambiguous situations (2 fields having the same name on 2 different objects) or references of deleted elements in some metadata objects.

The identified nodes and edges are then provided to the graph creator 154 at 214. The graph creator 154, in turn, generates the graph file (directed or undirected) at 216. The graph file is then provided to the local workspace 160 at 218.

Upon request, the local workspace 160 generates a request to analyze the graph at 222. For example, the request may be to analyze the graph for one of a use, an impact, a toxicity, a contagion, a collision, etc. Based upon the request, the graph analyzer 156 analyzes the graph using the corresponding analysis method and generates the data output at 224. The data output is provided to the graph visualizer 158 at 226. The graph visualizer 158, in turn, generates a visual representation of the data output at 228. The visual representation is then provided back to the local workspace where it may be displayed to the user at 230. As can be appreciated, once the graph creator 154 creates the graph, the steps of 222-230 may be repeated any number of times to perform any number of analysis methods available.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method executable by a computer having a processor to analyze complex metadata of a data source, the method comprising:
    receiving, by the computer, a data file from the data source, wherein the data file comprises digital data representing the complex metadata of the data source;
    creating a dictionary of metadata by the processor, wherein the dictionary of metadata defines nodes and edges in the complex metadata of the data source, and wherein the nodes represent at least portions of metadata objects in the complex metadata and the edges represent relationships between nodes;
    forming, by the processor, a graphical representation of the dictionary using a cleaning analysis method that considers the nodes and edges that define the complex metadata of the data source, wherein the processor automatically identifies unused objects in the complex metadata by identifying nodes that are associated with a low number of edges; and
    providing the graphical representation for presentation on a display.

2. The method of claim 1, wherein the dictionary includes entries associated with each metadata object of the complex metadata.

3. The method of claim 2, wherein the entries include relationship information for each metadata object of the complex metadata.

4. The method of claim 1, wherein the graph of nodes is a directed graph.

5. The method of claim 1, wherein the graph of nodes is an undirected graph.

6. The method of claim 1, wherein the data source is a multi-tenant database system.

7. A multi-tenant server system for analyzing complex metadata of a data source, comprising:
    a multi-tenant database having stored thereon complex metadata; and
    at least one data processing system configured to receive a data file comprising the complex metadata from the multi-tenant database, to assemble a dictionary of metadata that defines nodes and edges in the complex metadata such that the nodes represent at least portions of metadata objects in the complex metadata and the edges represent relationships between nodes, to form a graphical representation of the dictionary using a cleaning analysis method that considers the nodes and edges that define the complex metadata and that automatically identifies unused objects in the complex metadata by identifying nodes that are associated with a low number of edges, and to provide the graphical representation of the dictionary for presentation on a display.

8. The multi-tenant server system of claim 7, wherein the dictionary includes entries associated with each metadata object of the complex metadata, wherein the entries include relationship information for each metadata object of the complex metadata, wherein the graph is at least one of a directed graph and an undirected graph, and wherein the feature analysis method is at least one of an impact analysis method, a use analysis method, a collision analysis method, a contagion analysis method, a toxicity analysis method, and a cleaning analysis method.

9. A computer-implemented method executable by a computer having a processor to analyze complex metadata of a data source, the method comprising:
    receiving, by the computer, a data file from the data source, wherein the data file comprises digital data representing the complex metadata of the data source;
    creating a dictionary of metadata by the processor, wherein the dictionary of metadata defines nodes and edges in the complex metadata of the data source, and wherein the nodes represent at least portions of metadata objects in the complex metadata and the edges represent relationships between nodes;
    forming, by the processor, a graphical representation of the dictionary using a contagion analysis method that considers the nodes and edges that define the complex metadata of the data source so that the edges are mapped to show chains of relationships between nodes, and wherein the chains of relationships are filtered so only those nodes having the greatest chains of relationships are presented in the visual representation; and
    providing the graphical representation for presentation on a display.

10. The method of claim 9, wherein the dictionary includes entries associated with each metadata object of the complex metadata.

11. The method of claim 10, wherein the entries include relationship information for each metadata object of the complex metadata.

12. The method of claim 9, wherein the graph of nodes is a directed graph.

13. The method of claim 9, wherein the graph of nodes is an undirected graph.

14. The method of claim 9, wherein the data source is a multi-tenant database system.

* * * * *